Patented Apr. 7, 1925.

1,532,631

UNITED STATES PATENT OFFICE.

EMIL MOLZ, OF HALLE-ON-THE-SAALE, GERMANY, ASSIGNOR TO THE FARBENFA-BRIKEN VORM. FRIEDR. BAYER AND CO., OF LEVERKUSEN, NEAR COLOGNE-ON-THE-RHINE, GERMANY.

FUNGICIDE, INSECTICIDE, AND BACTERICIDE COMPOUND.

No Drawing.   Application filed March 21, 1923.   Serial No. 626,634.

*To all whom it may concern:*

Be it known that I, EMIL MOLZ, a citizen of Germany, residing at Halle-on-the-Saale, Bismarckstrasse 13, State of Prussia, in Germany, have invented new and useful Improvements in Fungicide, Insecticide, and Bactericide Compounds, of which the following is a specification.

The present invention relates to powders of sulfur which are produced by precipitating sulfur on to inert powder particles by chemical reaction or from solutions e. g. by impregnating inert powders, like kieselguhr, $CaSO_4$, kaolin, talc, etc. with gaseous or aqueous solutions of a product from which sulfur is precipitated by the addition of another product (gaseous or liquid) e. g. by impregnating kieselguhr etc. with an aqueous solution of polysulfides ($K_2S_3$, $K_2S_4$, $K_2S_5$), drying and treating then the resulting powders with an acid. An inert powder can also be treated with a solution of $CaCl_2$, saturated with gaseous $SO_2$ and then treated with $SH_2$; or sulfur is dissolved in $CS_2$, with this solution an inert powder is impregnated and then the $CS_2$ is allowed to vaporize. By these processes a very intimate combination of finely divided sulfur particles with inert particles is obtained; or inert powders are impregnated with milk of sulfur, dried and powdered. The products are valuable fungicides, insecticides and bactericides for plant protection. Other fungicide, insecticide or bactericide products can be admixed to these powders. Such fungicide, insecticide and bactericide products can also be obtained by replacing sulfur by other fungicides, insecticides or bactericides, e. g. by moistening the inert compound e. g. with sodium arsenate, drying, impregnating with copper sulfate and treating then with acetic acid; or by impregnating the inert powder, e. g. kaolin, with a solution of copper acetate-arsenite in ammonia; or impregnating the inert compound with a colloidal solution of copper acetate-arsenite or arsenite etc. The products can also be directly prepared by grinding together the cited chemicals in a colloid mill. Similar products can be obtained by impregnating the inert compound e. g. kaolin (100 grams) with arsenite of sodium (6 grams), impregnating another part of kaolin (100 grams) with sulfate of iron (8 grams) or sulfate of zinc (8 grams) and grinding together the two preparations; or 100 grams of kaolin are impregnated with an aqueous solution of 12 grams of $CuSO_4$ and dried, 100 grams of kieselguhr are impregnated with a solution of 12 grams $CO_3Na_2$. The dried preparations are then ground together. By moisture of the air (rain or dew), an insoluble product results by chemical interaction. Or the inert material is impregnated with arsenite of sodium and a soap solution, dried, ground and mixed with chalk or magnesia, or part of the inert material is treated with arsenite and another part with soap solution and the two parts are then mixed together after drying and ground with chalk or magnesia. All these powders are very valuable for plant protection purposes.

Very effective arsenic dust powders can also be obtained by impregnating the inert powder with milk of lime treating with sodium arsenate and drying, or the inert powder is at first treated with the arsenic salt and then with milk of lime. Other products e. g. salts of nicotine, sulfur etc. can be admixed.

It has been further found that powders of sulfur of the kind, and with the above mentioned effect and also other effective dusting powders for plant protection purposes may be obtained by impregnating powders such as plaster, kaolin, kieselguhr, talc, etc., with sulfur or other substances insoluble in water, for instance, arsenic sulfid in the form of vapour, that therefore the vaporized solid substances are sublimed on to powder particles.

In order to avoid explosions this operation is carried out in the presence of gases or vapours which do not maintain combustion.

Powders prepared in this manner are considerably cheaper than the pure ground powders of the effective substances, but possess nevertheless the same effect as the latter.

The new preparations have proved to be very valuable for plant protection purposes. They can be used for a dry spraying of the plants or in any other manner. Their use is not entailed with any danger to the men who need not bear masks. Cases of poisoning have not been observed. A further advantage is the fact that they do not dissociate or unmingle. An unvariable action is thus secured without any damage for the plants nor an accumulation of poisonous products in the ground.

I claim:—

The process for producing dusting powders for plant protection purposes which process consists in vaporizing or subliming insoluble fungicides, insecticides or bactericides on to inert materials in finely divided state, substantially as described.

In testimony whereof I have hereunto set my hand.

EMIL MOLZ.